(12) United States Patent
Tanaka et al.

(10) Patent No.: US 9,325,957 B2
(45) Date of Patent: Apr. 26, 2016

(54) IMAGE PROCESSING DEVICE, METHOD, RECORDING MEDIUM AND IMAGING DEVICE

(71) Applicant: FUJIFILM Corporation, Tokyo (JP)

(72) Inventors: Seiji Tanaka, Saitama (JP); Kenkichi Hayashi, Saitama (JP); Tomoyuki Kawai, Saitama (JP); Noriko Kawamura, Saitama (JP); Hidekazu Kurahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 14/318,113

(22) Filed: Jun. 27, 2014

(65) Prior Publication Data

US 2014/0313368 A1    Oct. 23, 2014

Related U.S. Application Data

(63) Continuation of application No. PCT/JP2012/083220, filed on Dec. 21, 2012.

(30) Foreign Application Priority Data

Dec. 28, 2011    (JP) .................................. 2011-289366

(51) Int. Cl.
*H04N 3/14*    (2006.01)
*H04N 5/335*    (2011.01)
(Continued)

(52) U.S. Cl.
CPC ................. *H04N 9/69* (2013.01); *H04N 9/045* (2013.01); *H04N 2209/046* (2013.01)

(58) Field of Classification Search
CPC ....................... H04N 5/3458; H04N 2209/045; H04N 2209/046; H04N 9/67; H04N 9/76; H04N 5/357

USPC ................... 348/272–280, 222.1–223.1, 241; 382/162, 167, 254, 277, 280, 260, 274
See application file for complete search history.

(56) References Cited

U.S. PATENT DOCUMENTS 5,889,554 A    3/1999    Mutze
6,958,772 B1    10/2005    Sugimori
(Continued)

FOREIGN PATENT DOCUMENTS

EP    1793620 A1    6/2007
EP    2175656 A1    4/2010
(Continued)

OTHER PUBLICATIONS

Extended European Search Report dated Jul. 27, 2015, for European Application No. 12862325.3.
(Continued)

*Primary Examiner* — Kelly L Jerabek
(74) *Attorney, Agent, or Firm* — Birch, Stewart, Kolasch & Birch, LLP

(57) ABSTRACT

An image processing method according to an aspect of the present invention includes acquiring a mosaic image composed of pixels of a first color that contributes most to acquisition of a luminance signal among three colors for pixels, and pixels of second colors other than the first color, a first color image corresponding to pixels of the first color and a second color image corresponding to pixels of the second colors having respective different frequency ranges that are reproducible; extracting a region containing a spatial frequency at which the second color image is not reproducible while the first color image is reproducible, in an entire image area corresponding to the mosaic image; and reducing a chroma of an image corresponding to that region in an image acquired by demosaic processing on the mosaic image.

16 Claims, 7 Drawing Sheets

(51) Int. Cl.
*H04N 9/04* (2006.01)
*H04N 9/69* (2006.01)
*G06K 9/00* (2006.01)

(56) References Cited

U.S. PATENT DOCUMENTS

| | | | | |
|---|---|---|---|---|
| 7,525,583 | B2* | 4/2009 | Kimbell | H04N 9/045 348/241 |
| 7,864,232 | B2* | 1/2011 | Kinoshita | H04N 5/335 348/234 |
| 8,457,433 | B2* | 6/2013 | Hong | G06T 3/4015 358/3.26 |
| 8,953,058 | B2* | 2/2015 | Ben-Eliezer | H04N 9/045 348/222.1 |
| 2003/0067548 | A1 | 4/2003 | Sugimori | |
| 2005/0238225 | A1 | 10/2005 | Jo et al. | |
| 2005/0275736 | A1* | 12/2005 | Chiu | H04N 9/646 348/272 |
| 2005/0285968 | A1 | 12/2005 | Sugimori | |
| 2009/0200451 | A1 | 8/2009 | Conners | |
| 2010/0039539 | A1 | 2/2010 | Kinoshita | |
| 2010/0085452 | A1* | 4/2010 | Hirakawa | G06T 1/0007 348/273 |
| 2011/0181760 | A1 | 7/2011 | Horie | |
| 2012/0182454 | A1* | 7/2012 | Schwartz | H04N 9/045 348/273 |
| 2013/0278801 | A1 | 10/2013 | Sawada et al. | |

FOREIGN PATENT DOCUMENTS

| | | |
|---|---|---|
| JP | 2-210996 A | 8/1990 |
| JP | 11-177996 A | 7/1999 |
| JP | 2000-253414 A | 9/2000 |
| JP | 2003-102025 A | 4/2003 |
| JP | 2010-45588 A | 2/2010 |
| JP | 2011-151739 A | 2/2010 |

OTHER PUBLICATIONS

Extended European Search Report dated Aug. 4, 2014, for European Application No. 11859479.5.
Extended European Search Report dated Jan. 27, 2015, for European Application No. 12804973.1.
Extended European Search Report dated Oct. 28, 2014, for European Application No. 11859950.5.
Hirakawa et al., "Spatio-Spectral Color Filter Array Design for Optimal Image Recovery", IEEE Transactions on Image Processing, vol. 17, No. 10, 2008, pp. 1876-1890.
International Search Report, mailed Mar. 5, 2013, issued in PCT/JP2012/083220.
Written Opinion of the International Searching Authority, mailed Mar. 5, 2013, issued in PCT/JP2012/083220.

* cited by examiner

BAYER ARRAY

RELATED ART

IMAGE PROCESSING DEVICE, METHOD, RECORDING MEDIUM AND IMAGING DEVICE

CROSS-REFERENCE TO RELATED APPLICATIONS

This application is a Continuation of PCT International Application No. PCT/JP2012/083220 filed on Dec. 21, 2012, which claims priority under 35 U.S.C §119(a) to Japanese Patent Application No. 2011-289366 filed on Dec. 28, 2011. Each of the above application(s) is hereby expressly incorporated by reference, in its entirety, into the present application.

BACKGROUND OF THE INVENTION

1. Field of the Invention

The present invention relates to an image processing device, an image processing method and an imaging device, and particularly to an art for reducing false color (color moire) generated by synchronization processing on a mosaic image corresponding to a color filter arrangement arrayed on a single-plate imaging element.

2. Description of the Related Art

FIG. 8A illustrates an example of a color filter arrangement provided for a conventional imaging element, illustrating a primary color Bayer array which is most widely used.

The Bayer array is composed of two patterns of alternating lines, in which one pattern line consists of alternating G and R pixels out of three primary colors R (red), B (blue) and G (green) for pixels, and the other pattern line consists of alternating G and B pixels. The G pixels are arranged in a checkered pattern.

FIG. 8B is a diagram illustrating frequencies which allow reproduction in a mosaic image of a Bayer array.

When the pitch of a single pixel in the horizontal and vertical directions is defined as p, as illustrated in FIG. 8A, the Nyquist frequency of G in the horizontal direction H and in the vertical direction V is $1/(2p)$, and the Nyquist frequency of each of R and B in the horizontal direction H and in the vertical direction V is $1/(4p)$. Meanwhile, the Nyquist frequency of each of R, G and B in the diagonally upper right and diagonally lower right directions is $1/(2\sqrt{2}p)$.

When a subject image having a spatial frequency of $1/(4p)$ or more and less than $1/(2p)$ is inputted in a horizontal direction H or vertical direction V where G color images and R, B color images have different Nyquist frequencies each other, as described above, the phases of RGB color images become out of phase due to the chromatic aberration of the lens, leading to the generation of false color (color moire).

For example, an input image with a pattern of black and white stripes gets colored at its edge when out-of-phase RGB color images are produced by the effect of chromatic aberration. The colored edge appears to be color moire at high frequencies corresponding to spatial frequencies described above. Especially, such a problem, the appearance of false color is noticeable in an imaging device that does not have an optical low-pass filter (optical LPF) for reducing the generation of false color on the front of the light receiving surface of the imaging element.

A conventional image processing device corrects false color and color shifts by detecting a color shift generated by the chromatic aberration of a lens based on the correlation of two color components (R and G) and by scaling RGB color images according to the detected color shift, as is proposed in Japanese Patent Application Laid-Open No. 2010-045588 (PTL 1).

An image processing device described in PTL 1 shows the effect of reducing false color in input images which frequency is converted to a frequency lower than the Nyquist threshold frequencies of RB color images by its optical LPF. Unfortunately, it has been found out that the phases of RB color images become out of phase due to the chromatic aberration of the lens, leading to the generation of false color (color moire), when an input image having a spatial frequency of $1/(4p)$ or more and less than $1/(2p)$ is taken by an imaging device without an optical LPF.

In other words, correction cannot be made for chromatic aberrations generated in the neighborhood of a resolution with a Nyquist threshold frequency of $1/(4p)$ or more for RB color images and a Nyquist threshold frequency of less than $1/(2p)$ for G color images, among lens aberrations generated in a full frequency range.

As a conventional art for solving problems of this kind, an image processing method is proposed, as is described in Japanese Patent Application Laid-Open No. 2003-102025 (PTL 2). The image processing method described in PTL 2 allows you to extract a high-frequency component of a luminance component from a color signal of interest and detect the hue of the color signal of interest and the hues of peripheral pixels using pixels except for the pixels located in horizontal and vertical directions which present high possibility of false color generation. When the hue of the color signal of interest is within a predetermined hue region which is one of the characteristics of false color, and the extracted high-frequency component is in a high-frequency region, false color is reduced by making correction so as to bring the hue of the color signal of interest close to the hues of the peripheral signals.

SUMMARY OF THE INVENTION

According to the invention described in PTL 2, when the hue of a color signal of interest is within a predetermined hue region which is a characteristic of false color (in an embodiment of PTL 2, the color filter arrangement of the imaging element is a Bayer array and a yellow region or a cyan region is designated as a hue region for false color), and is a high-frequency region, the generation of false color is reduced by making correction so as to bring the hue of the color signal of interest close to the hues of peripheral signals. Unfortunately, in some color filter arrangements for imaging elements, false color may not arise in a predetermined hue region. In this case, false color cannot be reduced. Even if the hue of a color signal of interest is in a predetermined hue region and is a high-frequency region, the color of the pixel of interest does not necessarily become false color.

In view of the circumstances described above, an object of the present invention is to provide an image processing device and method and an imaging device capable of properly reducing false color (color moire) generated by synchronization processing of a mosaic image without lowering resolution.

In order to achieve the above-mentioned object, an image processing device according to an aspect of the present invention includes an image acquisition unit configured to acquire a mosaic image, wherein the mosaic image includes pixels of a first color that contributes the most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible; a region extraction unit configured to extract a region containing a spatial frequency at which the second color image is not reproducible while the first color image is reproducible, in an entire image area corresponding to the mosaic image acquired by the image acquisition unit; a synchronization processing unit configured to determine pixel values of other colors at a position of each pixel in the mosaic image acquired by the image acquisition unit; and a chroma reduction unit configured to reduce the chroma of an image corresponding to the region extracted by the region extraction unit within an image synchronized by the synchronization processing unit.

According to the present aspect of the invention, a spatial frequency is identified at which two or more of the second color images corresponding to the second colors are not reproducible while the first color image corresponding to pixels of the first color is reproducible among pixels of the first color and pixels of the second colors of two or more colors that constitute a mosaic image, in an entire image area corresponding to the mosaic image, and a region containing the spatial frequency as a false color region (a region where false color can occur) is extracted. Then, the chroma of extracted false color regions in a synchronized image is reduced. This contributes to reducing the generation of false color (color moire) in the synchronized image. Additionally, this eliminates the need for providing an optical LPF on the front of the light receiving surface of an imaging element that acquires a mosaic image. Even if an optical LPF is provided, one with a reduced capability of cutting high frequency components to prevent the generation of false color can be used without sacrificing resolution.

In an image processing device according to another aspect of the present invention, the region extraction unit extracts the region containing the spatial frequency at which the second color image is not reproducible while the first color image is reproducible, in the entire image area corresponding to the mosaic image acquired by the image acquisition unit, based on pixels of the first color in the mosaic image, the first color image among the color images of the three primary colors synchronized by the synchronization processing unit, or a luminance image created from the color images of the three primary colors.

In an image processing device according to another aspect of the present invention, the region extraction unit includes an acquisition unit configured to move pixels or an image of a kernel size to carry out sequential acquisition from the pixels of the first color in the mosaic image acquired by the image acquisition unit, the first color images among the color images of the three primary colors synchronized by the synchronization processing unit, or a luminance image created from the color images of the three primary colors; a first calculation unit configured to calculate a mean value of pixels on a line in a direction perpendicular to a direction in which a non-reproducible spatial frequency exists, in the acquired pixels or image of the kernel size; a second calculation unit configured to detect a spatial frequency having the non-reproducible spatial frequency and a phase, based on the calculated mean values of pixels, so as to calculate an amplitude of the mean values of pixels at a time of detection; and a detection unit configured to detect the non-reproducible spatial frequency, based on a magnitude of the calculated amplitude.

It is preferable that in an image processing device according to another aspect of the present invention, depending on the magnitude of an amplitude calculated by the calculation unit, the chroma reduction unit makes the chroma of the image smaller as the amplitude is larger.

In an image processing device according to another aspect of the present invention, the first color is green (G) and the second colors are red (R) and blue (B); in the mosaic image, a line containing only G pixels and a line containing a mixture of R, G, B pixels are periodically and repeatedly arranged among lines being diagonally arranged; and the region extraction unit detects a region having a spatial frequency corresponding to an interval between lines containing only G pixels. As described above, a spatial frequency for extraction and a direction in which the spatial frequency occurs are specified so as to extract a region containing a spatial frequency to which these apply.

An image processing method according to another aspect of the present invention includes an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible; a region extraction step of extracting a region containing a spatial frequency at which the second color image is not reproducible while the first color image is reproducible, in an entire image area corresponding to the mosaic image acquired by the image acquisition step; a synchronization step of determining pixel values of other colors at a position of each pixel in the mosaic image acquired by the image acquisition step; and a chroma reduction step of reducing chroma of an image corresponding to the region extracted by the region extraction step within an image synchronized by the synchronization step.

An image processing program according to an aspect of the present invention causes a computer to execute an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible; a region extraction step of extracting a region containing a spatial frequency at which the second color image is not reproducible while the first color image is reproducible, in an entire image area corresponding to the mosaic image acquired by the image acquisition step; a synchronization step of determining pixel values of other colors at a position of each pixel in the mosaic image acquired by the image acquisition step; and a chroma reduction step of reducing chroma of an image corresponding to the region extracted by the region extraction step within an image synchronized by the synchronization step.

A computer-readable recording medium according to an aspect of the present invention, when a processor reads a command stored in the recording medium, causes the processor to execute an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible; a region extraction step of extracting a region containing a spatial frequency at which the second color image is not reproducible while the first color image is reproducible, in an entire image area corresponding to the mosaic image acquired by the image acquisition step; a synchronization step of determining pixel values of other colors at a position of each pixel in the mosaic image acquired by the image acquisition step; and a chroma reduction step of reducing chroma of an image corresponding to the region extracted by the region extraction step within an image synchronized by the synchronization step.

An imaging device according to another aspect of the present invention contains an imaging unit including a photographing optical system and an imaging element causing a subject image to form via the photographing optical system, the image acquisition unit configured to acquire a mosaic image outputted from the imaging unit, and the image processing device described above.

It is preferable that an imaging device according to another aspect of the present invention exclude an optical low-pass filter from a front of a light receiving surface on the imaging element. Since the image processing device described above contributes to reducing the generation of false color (color moire) in a synchronized image, a removal of an optical low-pass filter from the front of the light receiving surface on an imaging element does not cause any problem associated with the generation of false color. On the other hand, removal of an optical low-pass filter means that no damage occurs to resolution.

In an imaging device according to another aspect of the present invention, the imaging element has a color filter of a predetermined color filter arrangement on a plurality of pixels comprising photoelectric conversion elements arranged in a horizontal direction and in a vertical direction; the color filter arrangement includes a predetermined basic array pattern in which a first filter corresponding to the first color and a second filter corresponding to the second colors are arranged, and the basic array pattern is repeatedly arranged in the horizontal direction as well as in the vertical direction; the first filter is arranged on each line in the horizontal direction, the vertical direction, a diagonally upper right direction and a diagonally lower right direction of the color filter arrangement; the second filters are arranged on each line in the basic array pattern in the horizontal direction and the vertical direction of the color filter arrangement; and a ratio of a number of pixels of the first color corresponding to the first filter is larger than a ratio of a number of pixels of each of the second colors corresponding to the second filter.

It is preferable that in an imaging device according to another aspect of the present invention, the first color is green (G) and the second colors are red (R) and blue (B).

In an imaging device according to another aspect of the present invention, the predetermined basic array pattern is a squarely-arrayed pattern corresponding to 6×6 pixels; and the filter arrangement includes a first array corresponding to 3×3 pixels. The first array contains filters G arranged on the four corners and the center, filters B arranged above and below the filter G at the center, and filters R arranged on left and right sides of the filter G at the center. The filter arrangement further includes a second array corresponding to 3×3 pixels. The second array contains filters G arranged on the four corners and the center, filters R arranged above and below the filter G at the center, and filters B arranged on left and right sides of the filter G at the center. One or more of the first arrays and one or more of the second arrays are arranged alternately in a horizontal direction and in a vertical direction.

The present invention allows the extraction of a region containing a spatial frequency at which two or more of the second color images corresponding to the second colors are not reproducible while the first color image corresponding to pixels of the first color is reproducible among pixels of the first color and pixels of the second colors of two or more colors that constitute a mosaic image. Then, the chroma of extracted regions in a synchronized image is reduced. This contributes to reducing the generation of false color (color moire) in the synchronized image without sacrificing resolution.

DETAILED DESCRIPTION OF EXEMPLARY EMBODIMENTS

Hereinafter, preferred embodiments of an image processing device and method and an imaging device in accordance with the present invention will be described in detail with reference to the appended drawings.

[Embodiment of Imaging Device]

Figure 1:
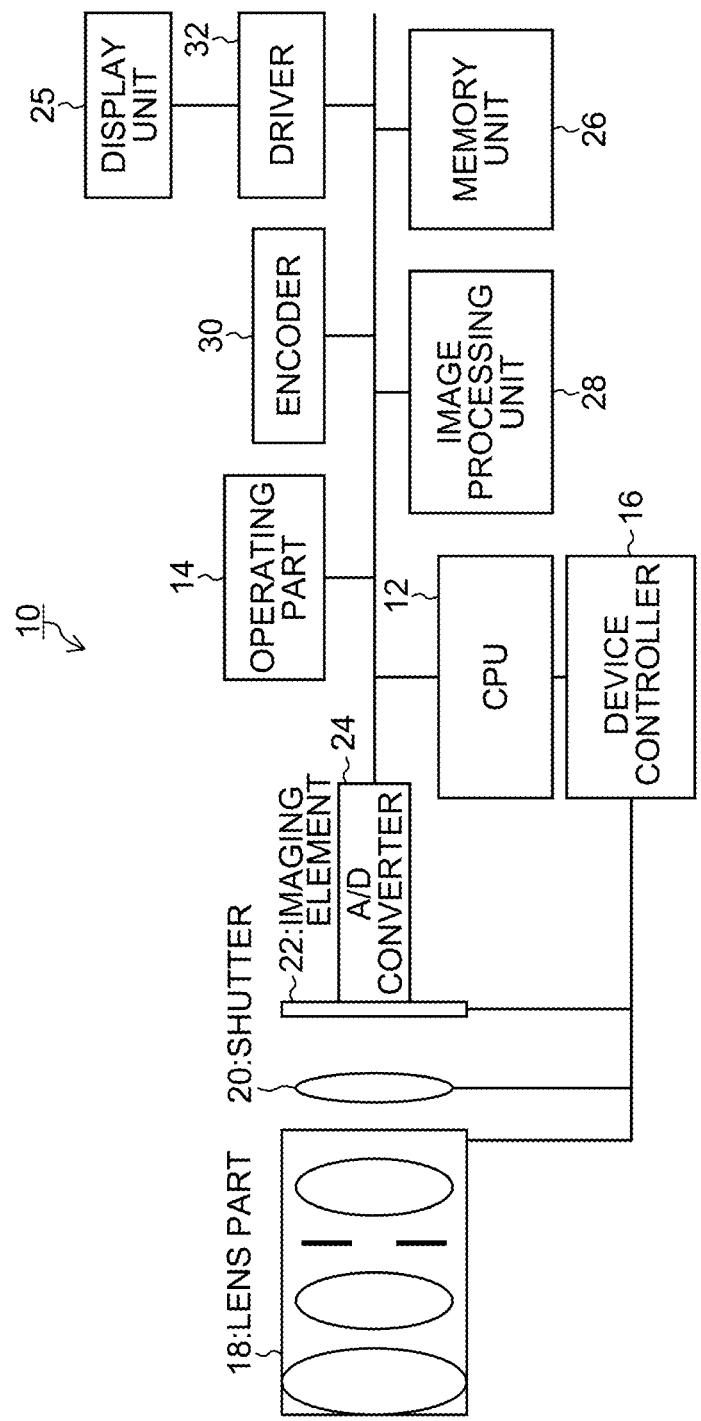
FIG. 1 is a block diagram illustrating an embodiment of an imaging device according to the present invention.

FIG. 1 is a block diagram illustrating an embodiment of an imaging device according to the present invention.

The imaging device 10 is a digital camera that records captured images on an internal memory (memory unit 26) or an external storage medium (not illustrated), and the overall operation of the device is integrally controlled by a central processing unit (CPU) 12.

The imaging device 10 has an operating part 14 including a shutter button or a shutter switch, a mode dial, a playback button, a MENU/OK key, a cross key, a zoom button, and a BACK key. A signal from the operating part 14 is inputted into the CPU 12, and based on the input signal, the CPU 12 controls each circuit in the imaging device 10. The CPU 12 controls a lens part 18, a shutter 20 and an imaging element 22 that functions as image acquisition unit, via a device controller 16, and, for example, exercises image taking control, imaging processing control, image data recording/playback control, and display control over a display unit 25.

The lens part 18 includes a focus lens, a zoom lens and a diaphragm. A pencil of light passing through the lens part 18 and the shutter 20 reaches a light receiving surface of the imaging element 22, and an image forms on the light receiving surface. Although a typical imaging device has an optical low-pass filter (optical LPF) for reducing the generation of false color on the front of the light receiving surface of its imaging element, this imaging device 10 does not have an optical LPF because it is provided with an image processing unit 28 for reducing false color (color moire), as described later.

The imaging element 22 has a great number of light receiving elements (photodiodes) arranged two-dimensionally. A subject image formed on the light receiving surface of each photodiode is converted to an amount of signal voltage (electric charge) in relation to the amount of the incident light.

<Embodiment of Imaging Element>

Figure 2:
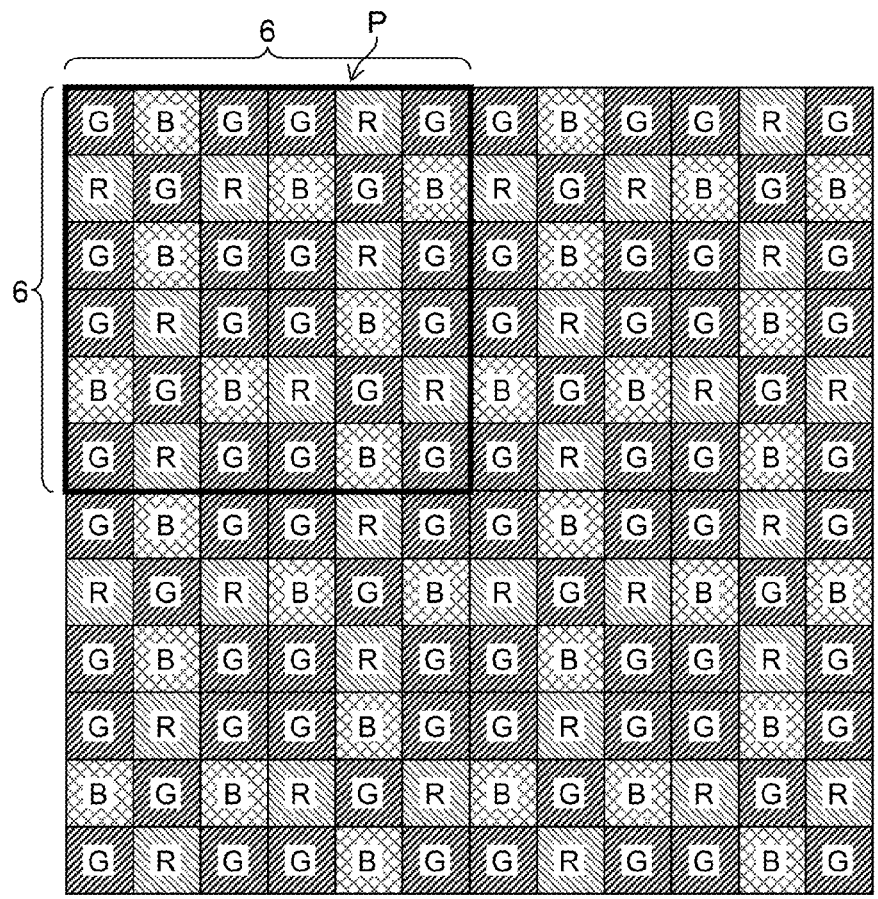
FIG. 2 is a diagram illustrating a new color filter arrangement in a mosaic pattern arranged on an imaging element.

FIG. 2 is a diagram illustrating an embodiment of the imaging element 22, in particular, a new color filter arrangement disposed on the light receiving surface of the imaging element 22.

The color filter arrangement of the imaging element 22 has a basic array pattern P (illustrated with a thick frame) that consists of a squarely-arrayed pattern corresponding to 6×6 pixels. The basic array pattern P is repeatedly arranged in a horizontal direction as well as in a vertical direction. In other words, filters (filter R, filter G, and filter B) having respective colors, red (R), green (G) and blue (B) are arranged with prescribed periodicity in the color filter arrangement. In comparison with a conventionally-known random arrangement, the arrangement of filters R, G, and B with prescribed periodicity allows RAW data of RGB (mosaic image) read from the imaging element 22 to be processed or the like according to a repeated pattern.

The color filter arrangement illustrated in FIG. 2 has at least one filter G corresponding to the color contributing the most to acquisition of luminance signals (in this embodiment, color G) arranged on each line in the horizontal, vertical, diagonally upper right (NE) and diagonally upper left (NW) directions of the color filter arrangement within a basic array pattern P.

NE represents a diagonally upper right direction and NW represents a diagonally lower right direction. For instance, in the case of a square arrangement of pixels, the diagonally upper right and diagonally lower right directions represent 45° upward or downward, respectively, relative to the horizontal direction, and the directions in the case of a rectangle arrangement of pixels mean the diagonal directions of the rectangle, thus the angles vary with the relationship in length between the long side and the short side.

At least one filter G corresponding to a luminance pixel is arranged on each line in the horizontal, vertical and diagonal (NE, NW) directions of the color filter arrangement. This allows improved reproducibility in synchronization processing (also called demosaicing. The same applies hereinafter in this specification.) at high frequencies regardless of a direction which presents high frequency.

Also, the color filter arrangement illustrated in FIG. 2 has one or more filters R and one or more filters B corresponding to at least two colors other than the color G (in this embodiment, colors R and B) arranged on individual lines in the directions of horizontal and vertical of the color filter arrangement within a basic array pattern P.

A filter R and a filter B arranged on individual lines in the directions of horizontal and vertical of the color filter arrangement enable the generation of false color (color moire) to be reduced. Reduction of false color generated within a certain frequency range in the diagonal directions is to be achieved by imaging processing according to the present invention described later.

This allows the elimination of an optical LPF for reducing (suppressing) the generation of false color. Even if an optical LPF is used, one with a reduced capability of cutting high frequency components to prevent the generation of false color can be used without sacrificing resolution.

Furthermore, in the color filter arrangement illustrated in FIG. 2, the numbers of pixels R, G and B corresponding to filters R, G and B are 8, 20 and 8, respectively, within a basic array pattern P. In other words, the ratio of the numbers of pixels R, G and B is 2:5:2, respectively. The percentage of the number of G pixels that contributes the most to acquisition of luminance signals is larger than the percentage of the number of pixels of any other color, i.e. R pixels and B pixels.

As described above, the percentage of the number of G pixels is different from that of each of R pixels and B pixels. In particular, the percentage of the number of G pixels that contributes the most to acquisition of luminance signals is set to be larger than the percentage of the number of each of R pixels and B pixels. This enables aliasing to be suppressed in synchronization processing and reproducibility at high frequencies to be improved.

Figure 3:
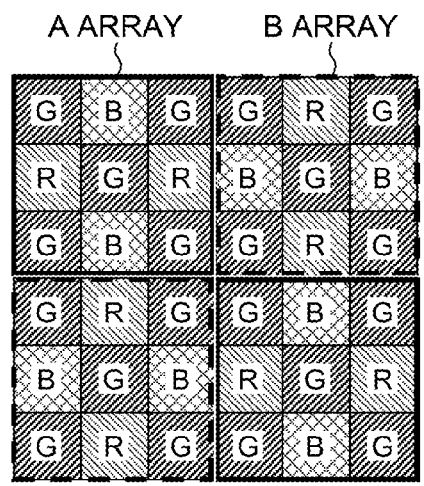
FIG. 3 illustrates a basic array pattern, illustrated in FIG. 2, which is split into four parts of 3×3 pixels.

FIG. 3 illustrates a basic array pattern P, illustrated in FIG. 2, which is split into four parts of 3×3 pixels.

In the basic array pattern P, as illustrated in FIG. 3, an A array that consists of 3×3 pixels indicated with a solid line frame and a B array that consists of 3×3 pixels indicated with a dashed line frame are arranged alternately in both horizontal and vertical directions.

In both the A array and the B array, a filter G is arranged on the four corners and the center, that is, the filters G are arranged on both the diagonals. The A array has filters R and filters B both sandwiching the filter G at the center in a horizontal direction and in a vertical direction, respectively. The B array, on the other hand, has filters B and filters R both sandwiching the filter G at the center in a horizontal direction and in a vertical direction, respectively. In other words, the A array and the B array have filters R and B inversed in position but the other filters arranged in a same way.

Moreover, filters G on the four corners of the A arrays and the B arrays constitute a square array that consists of 2×2 pixels of filters G, because the A arrays and the B arrays are arranged alternately in both horizontal and vertical directions.

Signal charge accumulated in the imaging element 22 having the above-described configuration is read out as a voltage signal in response to the signal charge based on a read signal applied from the device controller 16. The voltage signal read from the imaging element 22 is applied to an A/D converter 24, converted into digital signals R, C and B corresponding to the color filter arrangement in sequence by the A/D converter 24, and temporarily stored in the memory unit 26.

The memory unit 26 includes SDRAM (Synchronous Dynamic Random Access Memory), a type of volatile memory, and EEPROM (Electrically Erasable Programmable Read-Only Memory), a type of rewritable nonvolatile memory. The SDRAM is used as a work area during the execution of a program by the CPU 12, and as a storage area for temporarily retaining an imaged, acquired digital image signal. On the other hand, the EEPROM stores camera control programs including an image processing program, defect information on pixels in the imaging element 22, and various parameters and tables used for image processing and the like.

The image processing unit 28 performs predetermined signal processing such as white balance correction, gamma correction processing, synchronization processing, RGB/YC conversion, contour correction and color correction on digital image signals temporarily stored in the memory unit 26. Details of an image processing device (image processing unit 28) according to the present invention are described later.

Image data processed by the image processing unit 28 is encoded by an encoder 30 to data for image display and outputted via a driver 32 to the display unit 25 provided on the back of a camera. With this process, a subject image is displayed on the display screen of the display unit 25 in succession.

When the shutter button of the operating part 14 is pressed halfway down (first step), the CPU 12 starts Automatic Focus (AF) operation and Automatic Exposure Adjustment (AE) operation. Then, the CPU 12 moves the focus lens of the lens part 18 via the device controller 16 in an optical axis direction to control the position of the focus lens to be at a focal point.

With the shutter button depressed halfway, the CPU 12 calculates the brightness of a subject (photographing Ev value) based on image data outputted from the A/D converter 24 to determine exposure conditions (F value, shutter speed) in relation to the photographing Ev value.

When the shutter button is pressed all the way down (second step) after the completion of the AE operation and the AF operation, the time of accumulating electric charges on the diaphragm, the shutter 20 and the imaging element 22 is controlled according to the determined exposure conditions and imaging is carried out. Image data of a RGB mosaic image (image corresponding to the color filter arrangement illustrated in FIG. 2) read from the imaging element 22 and converted from analog to digital by the A/D converter 24 during the imaging is temporarily stored in the memory unit 26.

The image processing unit 28 reads image data stored temporarily in the memory unit 26 as appropriate and performs predetermined signal processing such as white balance correction, gamma correction, synchronization processing, RGB/YC conversion, contour correction and color correction. Image data (YC data) converted from RGB to YC is compressed according to a specified compression format (e.g., JPEG (Joint Photographic Experts Group) format). The compressed image data is recorded in an internal memory or an external memory according to a specified image file format (e.g., Exif (Exchangeable image file format) file).

[Image Processing]

Figure 4:
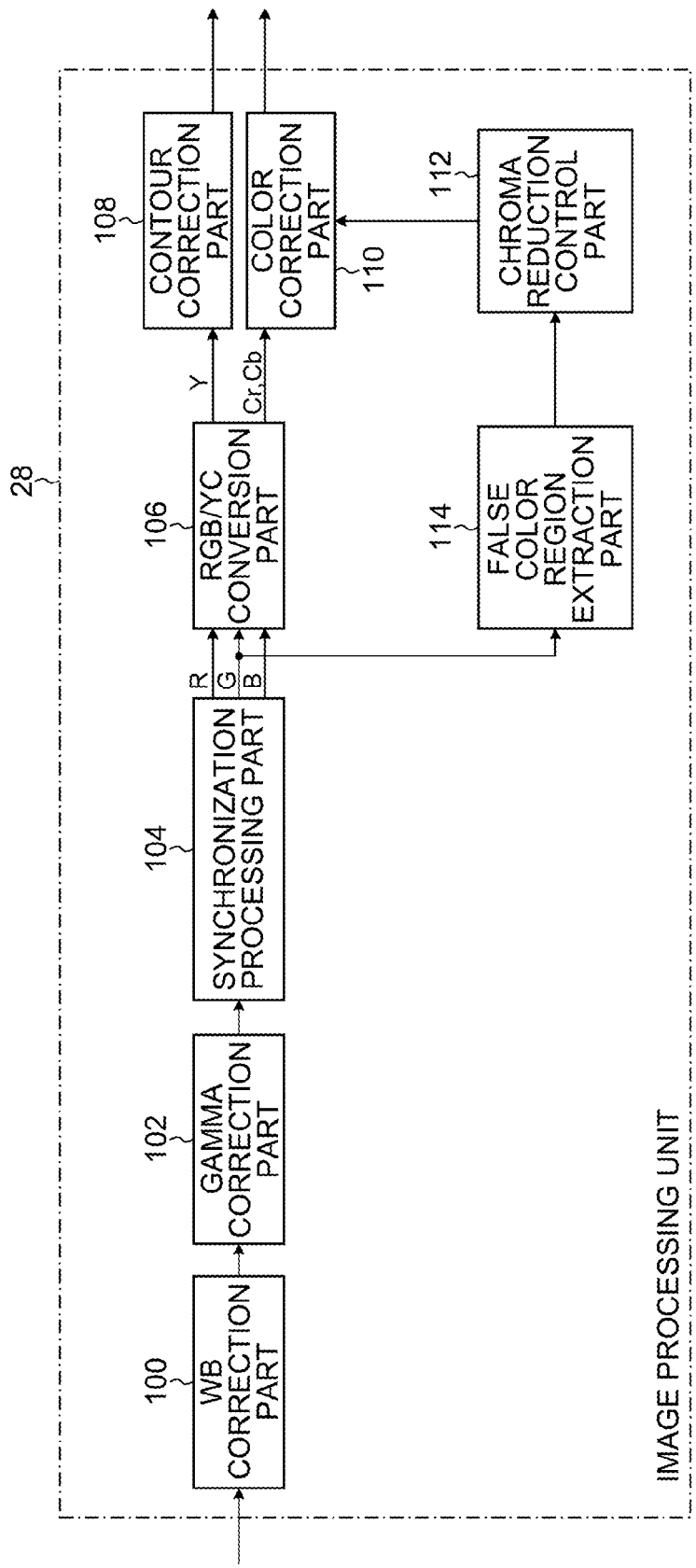
FIG. 4 is a block diagram illustrating an essential internal configuration of an image processing unit of FIG. 1.

FIG. 4 is a block diagram illustrating an essential internal configuration of an image processing unit 28 of FIG. 1.

As illustrated in FIG. 4, the image processing unit 28 includes a white balance (WB) correction part 100, a gamma correction part 102, a synchronization processing part (synchronization processing unit) 104, a RGB/YC conversion part 106, a contour correction part 108, a color correction part 110 according to a chroma reduction unit of the present invention, a chroma reduction control part 112, and a false color region extraction part 114 according to a region extraction unit of the present invention.

As described above, RAW data (a mosaic image) in the color filter arrangement form outputted from the imaging element 22 during imaging is temporarily stored in the memory unit 26. The image processing unit 28 acquires the mosaic image (RGB color signals) from the memory unit 26.

The acquired RGB color signals are dot-sequentially inputted to the WB correction part 100. The WB correction part 100 makes white balance correction by multiplying R, G, B color signals by gain values for WB correction Rg, Gg, and Bg, respectively.

Here, the gain values for WB correction Rg, Gg, and Bg are set to previously stored gain values Rg, Gg, and Bg corresponding to, for example, a type of light source (sunlight, fluorescent light, tungsten bulb or the like) identified by an analysis of RAW data, or gain values Rg, Gg, and Bg corresponding to a type of light source or color temperature manually selected on a menu screen for white balance correction.

The gamma correction part 102 receives the R, G, B color signals outputted from the WB correction part 100 and converts the linear color signals to gradation data of color spaces such as sRGB, AdobeRGB, and scRGB. The gamma corrected R, G, B color signals are outputted to the synchronization processing part 104.

The synchronization processing part 104 interpolates the spatial blanks of R, G, B color signals involved in the color filter arrangement of the imaging element 22 to synchronously convert the R, G, B color signals (also called as demosaicing) so that the pixel values of other colors at the position of a subject pixel for synchronization processing are determined by interpolating the values of pixels of the same colors in the vicinity of the subject pixel.

The RGB/YC conversion part 106 converts the synchronized R, G, B color signals to a luminance signal Y and color-difference signals Cr, Cb and outputs the luminance data Y to the contour correction part 108 and the color-difference signals Cr, Cb to the color correction part 110. The contour correction part 108 enhances the edge (portion with large luminance change) of the luminance signal Y.

The color correction part 110 perform a matrix multiplication between the input color-difference signals Cr, Cb and a 2 by 2 coefficient matrix for color correction and make color correction to achieve proper color reproducibility. Normally, a preset coefficient matrix for color correction is used, however, the present invention uses a coefficient matrix for color correction that reduces chroma in relation to a control signal given from the chroma reduction control part 112 described later.

The luminance data Y corrected in edge and the color-difference data Cr, Cb corrected in color are compressed, and then recorded in an inner memory or an external memory.

<Reducing the Generation of False Color (Color Moire)>

A mosaic image outputted from the imaging element 22 with the color filter arrangement of FIG. 2 exhibits more resistance to the generation of false color (color moire), as described above, in a synchronized image than a mosaic image of a conventional Bayer array does. The inventors, nevertheless, have found that there is a region susceptible to the generation of false color sporadically at frequencies lower than the Nyquist threshold of RGB.

Figure 5A:
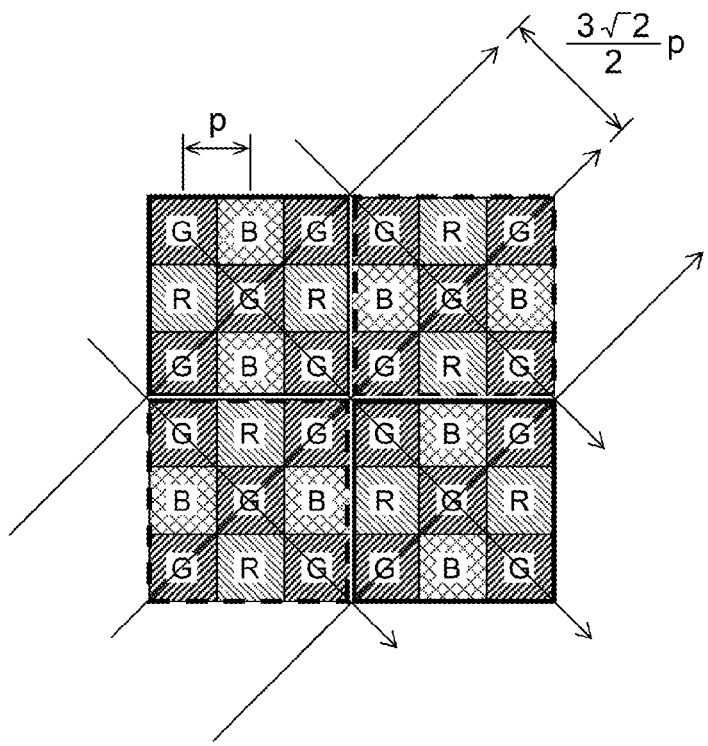
FIG. 5A is a diagram illustrating frequencies which allow reproduction along with a color filter arrangement illustrated in FIG. 2.
Figure 5B:
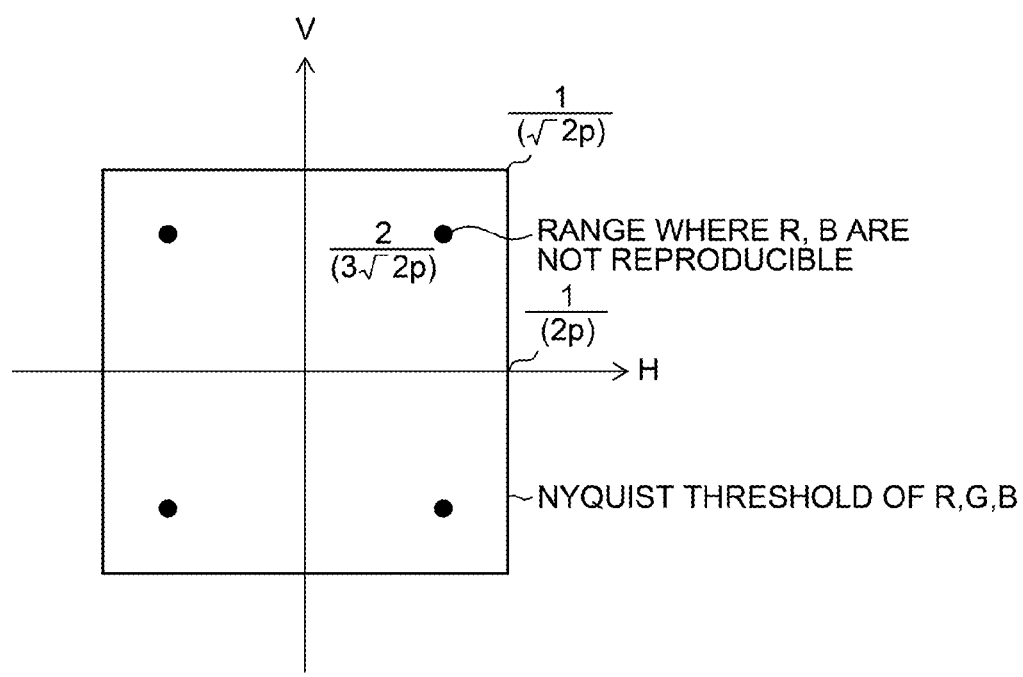
FIG. 5B is a diagram illustrating frequencies which allow reproduction along with a color filter arrangement illustrated in FIG. 2.

FIG. 5A illustrates a basic array pattern in a color filter arrangement of FIG. 2, and FIG. 5B is a diagram illustrating frequencies which allow reproduction by a mosaic image having a color filter arrangement of FIG. 2.

A color image of each of R, G and B has an identical square Nyquist threshold, as illustrated in FIG. 5B. To be more specific, when the pitch of a single pixel in the horizontal and vertical directions is defined as p, as illustrated in FIG. 5A, the Nyquist frequency of each of R, G and B in the horizontal direction H and in the vertical direction V is $1/(2p)$, and the Nyquist frequency of each of R, G and B in the diagonally upper right and diagonally lower right directions is $1/(\sqrt{2}p)$.

Meanwhile, of the lines in the diagonally upper right and diagonally lower right directions of a mosaic image having the color filter arrangement of FIG. 2, there are lines that contain only G pixels at regular intervals. Intervals between the lines that contain only G pixels are $(3\sqrt{2})p/2$.

When a subject with a pattern of stripes arrayed either in a diagonally upper right direction or in a diagonally lower right direction is imaged at intervals of $(3\sqrt{2})p/2$ on the imaging element 22, and the phase of light and darkness of the striped pattern coincides with that of the lines that contains only G pixels, the pixels of colors (RB colors) on the striped pattern, if interpolated in relation to the pixels of RB colors on the neighboring pixels at the time of synchronization processing, illustrate errors in color. As a result, false color (color moire) arises in the subject image of the striped pattern.

In other words, a spatial frequency of $(2/(3\sqrt{2})p)$ corresponding to an interval of $(3\sqrt{2})p/2$ between lines either in a diagonally upper right direction or in a diagonally lower right direction represents a range where R, B color images are not reproducible while G color images are reproducible.

The range where R, B color images are not reproducible exists sporadically as illustrated with black dots of FIG. 5B, and more specifically, it exists in a funnel shape in which ranges indicated with black dots are minimized.

The present invention allows the extraction of a region which has ranges at which R, B color images are not reproducible while G color images are reproducible (false color region: a region where false color can occur) from an entire image area. The extraction is made so as to reduce the chroma of extracted false color regions.

With reference back to FIG. 4, the false color region extraction part 114 receives a G color signal (G color image) synchronized by the synchronization processing part 104. Then, the false color region extraction part 114 extracts a false color region from the entire area of the G image, wherein the false color region has ranges at which R, B color images are not reproducible while G color images are reproducible.

After a false color region is extracted by the false color region extraction part 114, the chroma reduction control part 112 controls color correction coefficients of the matrix in the color correction part 110 so as to decrease the level of color-difference signals Cr, Cb corresponding to the false color region.

Detailed operations of the false color region extraction part 114 and the chroma reduction control part 112 will now be described.

Figure 6:
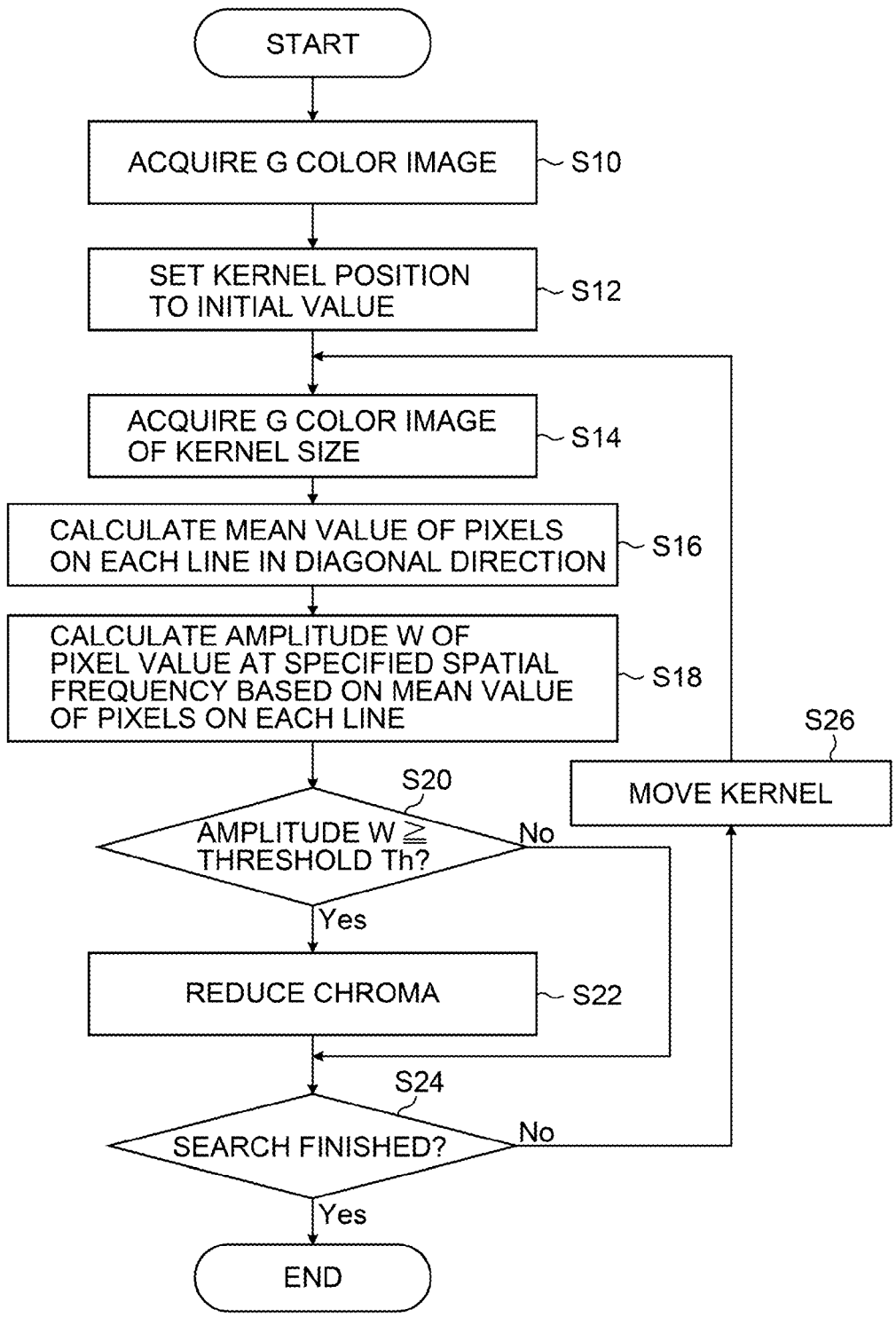
FIG. 6 is a flowchart illustrating an embodiment of an imaging processing method according to the present invention.

FIG. 6 is a flowchart illustrating an embodiment of an imaging processing method according to the present invention.

With reference to FIG. 6, the false color region extraction part 114 acquires a G color image synchronized by the synchronization processing part 104 (the step S10). Then, it sets the position of a kernel for obtaining an image in a local region from the G color image to an initial value (for example, the upper left position of the G color image) (the step S12).

Figure 7A:
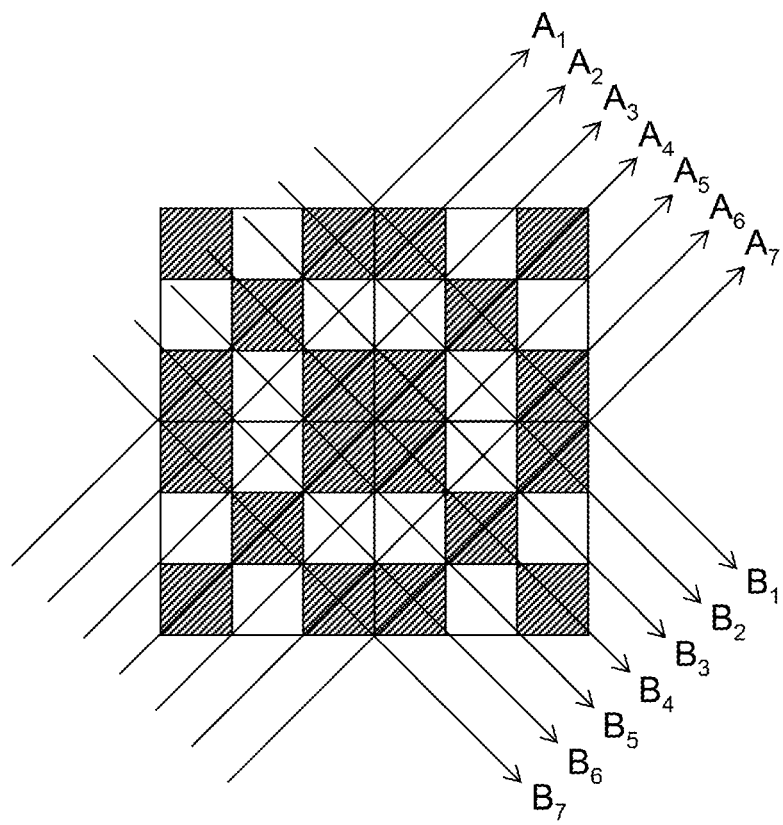
FIG. 7A is a diagram for illustrating a method of extracting frequencies at which R, B color images are not reproducible while G color images are reproducible from a mosaic image of a color filter arrangement illustrated in FIG. 2.

Next, it acquires the G color image of a kernel size based on the current kernel position (the step S14). Note that the kernel size should be a size which enables the detection (detection) of a spatial frequency corresponding to an interval of $(3\sqrt{2})p/2$ illustrated in FIG. 5A. In this embodiment, the kernel size is set to 6×6 pixels, as illustrated in FIG. 7A. Also, in FIG. 7A, diagonally shaded pixels indicate the position of G pixels in a mosaic image.

Then, it determines the mean values $A_{ave1}$ to $A_{ave7}$ of G pixels on respective lines $A_1$ to $A_7$ in the diagonally upper right direction of the G color image in the kernel and the mean values $B_{ave1}$ to $B_{ave7}$ of G pixels on respective lines $B_1$ to $B_7$ in the diagonally lower right direction of the G color image (the step S16).

Figure 7B:
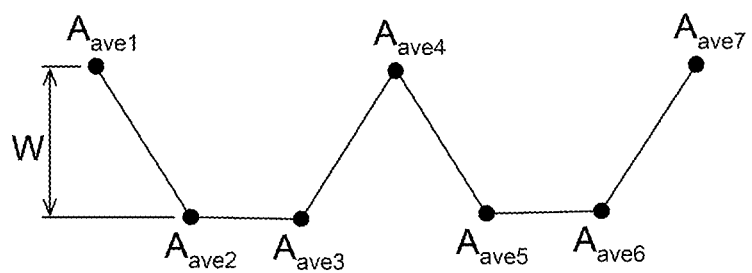
FIG. 7B is a diagram for illustrating a method of extracting frequencies at which R, B color images are not reproducible while G color images are reproducible from a mosaic image of a color filter arrangement illustrated in FIG. 2.

When a pattern is composed of stripes arrayed in a diagonally lower right direction and the phase of light and darkness of the striped pattern coincides with that of the lines that contains only G pixels, the mean values $A_{ave1}$ to $A_{ave7}$ of pixels on respective lines $A_1$ to $A_7$ represent a trace illustrated in FIG. 7B. In other words, the mean values $A_{ave1}$, $A_{ave4}$ and $A_{ave7}$ illustrate a bright pixel value of the substantially same level and the mean values $A_{ave2}$, $A_{ave3}$, $A_{ave5}$ and $A_{ave6}$ illustrate a dark pixel value of the substantially same level. Here, the bright pixel value and the dark pixel value mean relatively bright and dark pixel values, respectively, when there is a brightness difference that equals or exceeds a specified threshold between the two.

Based on the mean values $A_{ave1}$ to $A_{ave7}$ of pixels on respective lines $A_1$ to $A_7$ in a diagonally upper right direction, it first detects whether or not every mean value $A_{ave1}$, $A_{ave4}$ and $A_{ave7}$ is larger than each of the mean values $A_{ave2}$, $A_{ave3}$, $A_{ave5}$ and $A_{ave6}$. A true result is equivalent to the detection of a striped pattern with a spatial frequency described above as well as the detection of the fact that the phase of light stripes of the pattern nearly coincides with that of the lines that contains only G pixels. After a striped pattern having the phase as described above is detected, it calculates an absolute value of a difference (amplitude W) between the mean values $A_{ave1}$, $A_{ave4}$ and $A_{ave7}$ and the mean values $A_{ave2}$, $A_{ave3}$, $A_{ave5}$ and $A_{ave6}$, as illustrated in FIG. 7B. Likewise, when, based on the mean values $B_{ave1}$ to $B_{ave7}$ of pixels on respective lines $B_1$ to $B_7$ in a diagonally lower right direction, it detects every mean value $B_{ave1}$, $B_{ave4}$ and $B_{ave7}$ is larger than each of the mean values $B_{ave2}$, $B_{ave3}$, $B_{ave5}$ and $B_{ave6}$, it calculates an amplitude W between the mean values $B_{ave1}$, $B_{ave4}$ and $B_{ave7}$ and the mean values $B_{ave2}$, $B_{ave3}$, $B_{ave5}$ and $B_{ave6}$ (the step S18). When a striped pattern having the phase as described above is not detected, let the amplitude W be 0 for convenience.

Next, it determines if at least one of the amplitude W of the pattern striped in the diagonally upper right direction and the amplitude W of the pattern striped in the diagonally lower right direction calculated in the step S18 is greater than or equal to a preset threshold Th (the step S20).

When the amplitude W is greater than or equal to the threshold Th ("Yes"), it causes a transition to the step S22 and when the amplitude W is less than the threshold Th ("No"), it causes a transition to the step S24.

In the step S22, processing of reducing the chroma of an image in a region (false color region) corresponding to the current kernel position is performed.

More specifically, after receiving information that indicates a false color region from the false color region extraction part 114, the chroma reduction control part 112 changes color correction coefficients of the matrix in the color correction part 110 to smaller values so that the level of color-difference signals Cr, Cb for the false color region is decreased (chroma reduction).

In this processing, it is preferable that the chroma of an image is reduced to an extent depending on the magnitude of the amplitude W. For example, this can be achieved by multiplying a preset coefficient matrix for color correction by a coefficient a ($0 \le \alpha \le 1$) depending on the magnitude of an amplitude (degree of reducing chroma).

In the step S24, it determines whether or not the kernel has finished the search of the entire image area, and if not finished ("No"), it causes a transition to the step S26.

In the step S26, it moves the kernel by 6 pixels horizontally. When the kernel has reached the left end in a horizontal direction, it returns the kernel horizontally to the right end, moves the kernel by 6 pixels in a vertical direction, and then causes a transition to the step S14. The step S14 through the step S24 are repeated by moving the kernel as described above.

When it determines the search has been finished ("Yes") in the step S24, image processing for reducing the generation of false color is terminated.

The present embodiment as described above allows the extraction of a region (false color region) which has a spatial frequency at which R, B color images are not reproducible while G color images are reproducible from a square Nyquist threshold area of R, G, B as illustrated in FIG. 5B so as to reduce the chroma of the false color region. Consequently, this contributes to reducing the generation of false color (color moire). In an actual imaging device, the phases of R, B color images become out of phase due to chromatic aberration of the lens, facilitating the generation of false color in a false color region as described above, leading to increased resolution especially when an optical low-pass filter is removed. On account of this, false color is apt to occur in such a false color region. The present embodiment contributes to reducing the effect of such false color on image quality.

The kernel size is not limited to that of this embodiment, but various sizes can be employed. For example, you may use a kernel that extracts pixels only on the diagonals of 3×3 pixels so that the mean value of pixels on each diagonal is determined. Then, let the kernel move by one pixel after another to detect a striped pattern which coincides with spatial frequencies and phases corresponding to intervals between the lines that contain only G pixels in a color filter arrangement illustrated in FIG. 2 and calculate the light and dark (amplitude) of the striped pattern.

Alternatively, chroma reduction may be applied only to pixels in a false color region which correspond to the diagonal lines where only G pixels continuously exist on the mosaic image, or chroma reduction may be applied to pixels in an entire false color region.

[Other Embodiments]

Figure 8A:
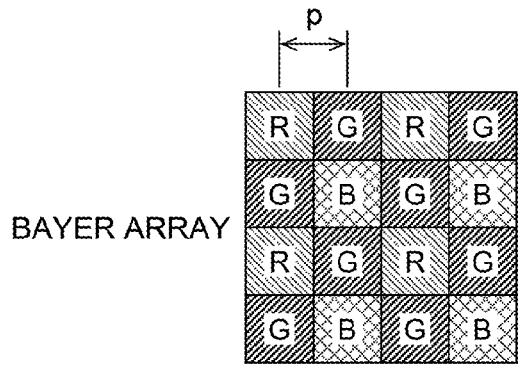
FIG. 8A is a diagram illustrating frequencies which allow reproduction along with a color filter arrangement of a Bayer array.
Figure 8B:
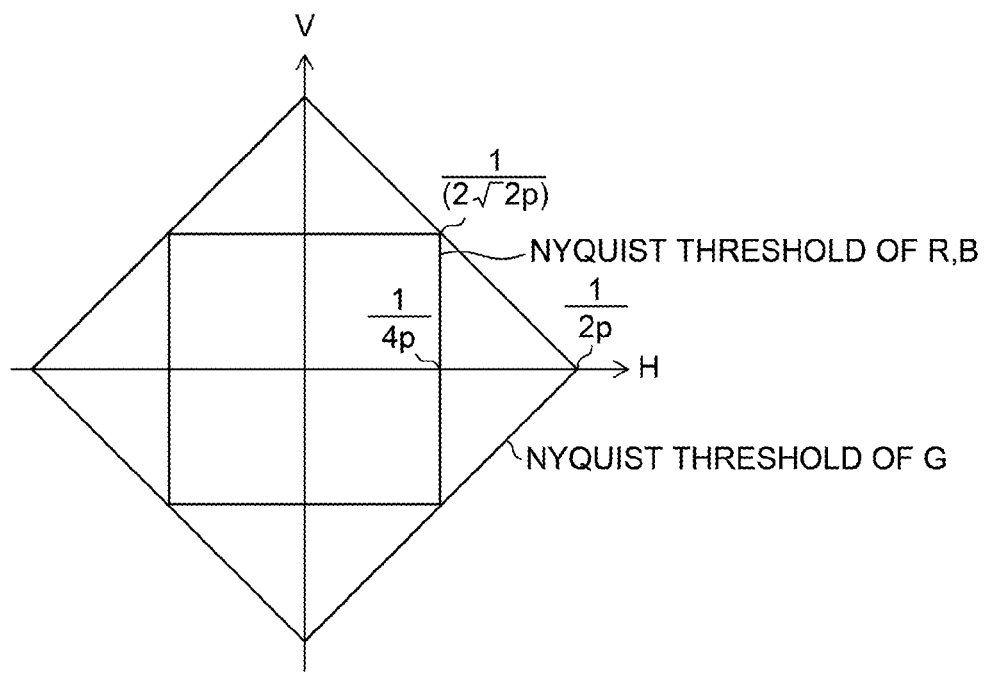
FIG. 8B is a diagram illustrating frequencies which allow reproduction along with a color filter arrangement of a Bayer array.

The present invention can be applied not only to mosaic images having the color filter arrangement illustrated in FIG. 2 but also to mosaic images of various color filter arrangements, and for example, enables the reduction of false color generated by synchronization processing on a mosaic image of the Bayer array illustrated in FIG. 8A.

In this case, in like manner with the embodiment described above, a region (false color region: a region where false color can occur) containing a spatial frequency of 1/(4p) or more and less than 1/(2p) either in the horizontal direction H or the vertical direction V is detected based on G color images in an entire image area, and the chroma of an image in the detected false color region is reduced. This allows the elimination of an optical LH for reducing the generation of false color without sacrificing resolution.

In addition, the false color region extraction part 114 detects a false color region based on synchronized G color images, however, the extraction of false color regions is not limited to this means, but may be performed based on G pixels in a mosaic image or a luminance signal Y (luminance image) converted by the RGB/YC conversion part 106.

Moreover, processing of reducing chroma is not limited to by the method in which a coefficient matrix for color correction in the color correction part 110, i.e. a multiplier for color-difference signals Cr, Cb is decreased, but may be performed, for example, by a method in which, of the values of synchronized RGB pixels, the values of R, B pixels are made close to the value of 0 pixels.

Additionally, processing by the image processing unit 28 described above may be performed by another image processing device separate from the imaging device 10 (for example, a computer (PC: Personal Computer) in which image processing software is installed).

Furthermore, the present invention can be provided as different forms such as: a computer-readable program code for enabling a computer to execute processing described above; a recording medium (e.g., an optical disc (e.g., CD (Compact Disc), DVD (Digital Versatile Disc), BD (Blu-ray Disc)), a magnetic disk (e.g., a hard disk, a magneto-optical disk)), which are non-transitory as well as computer-readable and contain the program code; and a computer program product which contains executable codes for the media.

In addition, application of the present invention is not limited to the embodiments described above, and it should be understood that various modifications and alterations may occur insofar as they are within the scope of the present invention.

What is claimed is:

1. An image processing device comprising:
    an image acquisition unit configured to acquire a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;
    a region extraction unit configured to extract a region containing a spatial frequency at which the second color image is not reproducible while the first color image is reproducible, in an entire image area corresponding to the mosaic image acquired by the image acquisition unit;
    a demosaic processing unit configured to determine pixel values of other colors at a position of each pixel in the mosaic image acquired by the image acquisition unit; and
    a chroma reduction unit configured to reduce chroma of an image corresponding to the region extracted by the region extraction unit within an image processed by the demosaic processing unit,
    wherein the region extraction unit comprises:
    an acquisition unit configured to move pixels or an image of a kernel size to carry out sequential acquisition from the pixels of the first color in the mosaic image acquired by the image acquisition unit, the first color images among the color images of the three primary colors processed by the demosaic processing unit, or a luminance image created from the color images of the three primary colors;
    a first calculation unit configured to calculate a mean value of pixels on a line in a direction perpendicular to a direction in which a non-reproducible spatial frequency exists, in the acquired pixels or image of the kernel size;
    a second calculation unit configured to detect a spatial frequency having the non-reproducible spatial frequency and a phase, based on the calculated mean values of pixels, so as to calculate an amplitude of the mean values of pixels at a time of detection; and
    a detection unit configured to detect the non-reproducible spatial frequency, based on a magnitude of the calculated amplitude.

2. The image processing device according to claim 1,
wherein, depending on the magnitude of an amplitude calculated by the second calculation unit, the chroma reduction unit makes the chroma of the image smaller as the amplitude is larger.

3. An imaging device, comprising:
an imaging unit including a photographing optical system and an imaging element causing a subject image to form via the photographing optical system;
the image acquisition unit configured to acquire a mosaic image outputted from the imaging unit; and
the image processing device according to claim 1.

4. The imaging device according to claim 3,
wherein an optical low-pass filter is removed from a front of a light receiving surface on the imaging element.

5. The imaging device according to either claim 3,
wherein the imaging element has a color filter of a predetermined color filter arrangement on a plurality of pixels comprising photoelectric conversion elements arranged in a horizontal direction and in a vertical direction,
wherein the color filter arrangement includes a predetermined basic array pattern in which a first filter corresponding to the first color and a second filter corresponding to the second colors are arranged, and the basic array pattern is repeatedly arranged in the horizontal direction as well as in the vertical direction,
wherein the first filter is arranged on each line in the horizontal direction, the vertical direction, a diagonally upper right direction and a diagonally lower right direction of the color filter arrangement,
wherein the second filters are arranged on each line in the basic array pattern in the horizontal direction and the vertical direction of the color filter arrangement, and
wherein a ratio of a number of pixels of the first color corresponding to the first filter is larger than a ratio of a number of pixels of each of the second colors corresponding to the second filter.

6. The imaging device according to claim 5,
wherein the first color is green (G) and the second colors are red (R) and blue (B).

7. The imaging device according to claim 6,
wherein the predetermined basic array pattern is a squarely-arrayed pattern corresponding to 6×6 pixels, and
wherein the filter arrangement is configured such that a first array and a second array are arranged alternately in the horizontal direction and in the vertical direction,
the first array corresponding to 3×3 pixels, containing filters G arranged on four corners and a center, filters B arranged above and below filter G at the center, and filters R arranged on left and right sides of the filter G at the center,
the second array corresponding to 3×3 pixels, containing filters G arranged on four corners and a center, filters R arranged above and below filter G at the center, and filters B arranged on left and right sides of the filter G at the center.

8. An image processing device comprising:
an image acquisition unit configured to acquire a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;
a region extraction unit configured to extract a region containing a spatial frequency at which the second color image is not reproducible while the first color image is reproducible, in an entire image area corresponding to the mosaic image acquired by the image acquisition unit;
a demosaic processing unit configured to determine pixel values of other colors at a position of each pixel in the mosaic image acquired by the image acquisition unit; and
a chroma reduction unit configured to reduce chroma of an image corresponding to the region extracted by the region extraction unit within an image proccessed by the demosaic processing unit,
wherein the first color is green (G) and the second colors are red (R) and blue (B),
wherein, in the mosaic image, a line containing only G pixels and a line containing a mixture of R, G, B pixels are periodically and repeatedly arranged among lines being diagonally arranged, and
wherein the region extraction unit detects a region having a spatial frequency corresponding to an interval between lines containing only G pixels.

9. An imaging device, comprising:
an imaging unit including a photographing optical system and an imaging element causing a subject image to form via the photographing optical system;
the image acquisition unit configured to acquire a mosaic image outputted from the imaging unit; and
the image processing device according to claim 8.

10. The imaging device according to claim 9,
wherein an optical low-pass filter is removed from a front of a light receiving surface on the imaging element.

11. The imaging device according to either claim 9,
wherein the imaging element has a color filter of a predetermined color filter arrangement on a plurality of pixels comprising photoelectric conversion elements arranged in a horizontal direction and in a vertical direction,
wherein the color filter arrangement includes a predetermined basic array pattern in which a first filter corresponding to the first color and a second filter corresponding to the second colors are arranged, and the basic array pattern is repeatedly arranged in the horizontal direction as well as in the vertical direction,
wherein the first filter is arranged on each line in the horizontal direction, the vertical direction, a diagonally upper right direction and a diagonally lower right direction of the color filter arrangement,
wherein the second filters are arranged on each line in the basic array pattern in the horizontal direction and the vertical direction of the color filter arrangement, and
wherein a ratio of a number of pixels of the first color corresponding to the first filter is larger than a ratio of a number of pixels of each of the second colors corresponding to the second filter.

12. The imaging device according to claim 11,
wherein the predetermined basic array pattern is a squarely-arrayed pattern corresponding to 6×6 pixels, and
wherein the color filter arrangement is configured such that a first array and a second array are arranged alternately in the horizontal direction and in the vertical direction,
the first array corresponding to 3×3 pixels, containing filters G arranged on four corners and a center, filters B arranged above and below filter G at the center, and filters R arranged on left and right sides of the filter G at the center, the second array corresponding to 3×3 pixels, containing filters G arranged on four corners and a center, filters R arranged above and below filter G at the center, and filters B arranged on left and right sides of the filter G at the center.

13. An image processing method comprising:

an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;

a region extraction step of extracting a region containing a spatial frequency at which the second color image is not reproducible while the first color image is reproducible, in an entire image area corresponding to the mosaic image acquired by the image acquisition step;

a demosaicing step of determining pixel values of other colors at a position of each pixel in the mosaic image acquired by the image acquisition step; and a chroma reduction step of reducing chroma of an image corresponding to the region extracted by the region extraction step within an image processed by the demosaicing step, wherein the region extraction step comprises:

an acquisition step of movng pixels or an image of a kernel size to carry out sequential acquisition from the pixels of the first color in the mosaic image acquired by the image acquisition step, the first color images among the color images of the three primary colors processed by the demosaic processing step, or a luminance image created from the color images of the three primary colors;

a first calculation step of calculating a mean value of pixels on a line in a direction perpendicular to a direction in which a non-reproducible spatial frequency exists, in the acquired pixels or image of the kernel size;

a second calculation step of detecting a spatial frequency having the non-reproducible spatial frequency and a phase, based on the calculated mean values of pixels, so as to calculate an amplitude of the mean values of pixels at a time of detection; and a detection step of detecting the non-reproducible spatial frequency, based on a magnitude of the calculated amplitude.

14. An image processing method comprising:

an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;

a region extraction step of extracting a region containing a spatial frequency at which the second color image is not reproducible while the first color image is reproducible, in an entire image area corresponding to the mosaic image acquired by the image acquisition step;

a demosaicing step of determining pixel values of other colors at a position of each pixel in the mosaic image acquired by the image acquisition step; and a chroma reduction step of reducing chroma of an image corresponding to the region extracted by the region extraction step within an image processed by the demosaicing step, wherein the first color is green (G) and the second colors are red (R) and blue (B), wherein, in the mosaic image, a line containing only G pixels and a line containing a mixture of R, G, B pixels are periodically and repeatedly arranged among lines being diagonally arranged, and wherein in the region extraction step, a region having a spatial frequency corresponding to an interval between lines containing only G pixels is detected.

15. A non-transitory computer-readable recording medium that, when a processor reads a command stored in the recording medium, causes the processor to execute:

an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;

a region extraction step of extracting a region containing a spatial frequency at which the second color image is not reproducible while the first color image is reproducible, in an entire image area corresponding to the mosaic image acquired by the image acquisition step;

a demosaicing step of determining pixel values of other colors at a position of each pixel in the mosaic image acquired by the image acquisition step; and a chroma reduction step of reducing chroma of an image corresponding to the region extracted by the region extraction step within an image processed by the demosaicing step, wherein the region extraction step comprises:

an acquisition step of movng pixels or an image of a kernel size to carry out sequential acquisition from the pixels of the first color in the mosaic image acquired by the image acquisition step, the first color images among the color images of the three primary colors processed by the demosaic processing step, or a luminance image created from the color images of the three primary colors;

a first calculation step of calculating a mean value of pixels on a line in a direction perpendicular to a direction in which a non-reproducible spatial frequency exists, in the acquired pixels or image of the kernel size;

a second calculation step of detecting a spatial frequency having the non-reproducible spatial frequency and a phase, based on the calculated mean values of pixels, so as to calculate an amplitude of the mean values of pixels at a time of detection; and a detection step of detecting the non-reproducible spatial frequency, based on a magnitude of the calculated amplitude.

16. A non-transitory computer-readable recording medium that, when a processor reads a command stored in the recording medium, causes the processor to execute:

an image acquisition step of acquiring a mosaic image, wherein the mosaic image includes pixels of a first color that contributes most to acquisition of a luminance signal among pixels of three primary colors, and pixels of second colors composed of two or more colors other than the first color, and wherein a first color image corresponding to the pixels of the first color and a second color image corresponding to the pixels of the second colors have respective different frequency ranges that are reproducible;

a region extraction step of extracting a region containing a spatial frequency at which the second color image is not reproducible while the first color image is reproducible, in an entire image area corresponding to the mosaic image acquired by the image acquisition step;

a demosaicing step of determining pixel values of other colors at a position of each pixel in, the mosaic image acquired by the image acquisition step; and a chroma reduction step of reducing chroma of an image corresponding to the region extracted by the region extraction step within an image processed by the demosaicing step, wherein the first color is green (G) and the second colors are red (R) and blue (B), wherein, in the mosaic image, a line containing only G pixels and a line containing a mixture of R, G, B pixels are periodically and repeatedly arranged among lines being diagonally arranged, and wherein in the region extraction step, a region having a spatial frequency corresponding to an interval between lines containing only G pixels is detected.

* * * * *